United States Patent
Xiong et al.

(10) Patent No.: US 10,569,427 B2
(45) Date of Patent: Feb. 25, 2020

(54) SERVO TRANSMISSION MECHANISM

(71) Applicant: UBTECH Robotics Corp, Shenzhen (CN)

(72) Inventors: Youjun Xiong, Shenzhen (CN);
Xiaopeng Wu, Shenzhen (CN);
Meichun Liu, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 119 days.

(21) Appl. No.: 15/856,054

(22) Filed: Dec. 28, 2017

(65) Prior Publication Data

US 2019/0160693 A1  May 30, 2019

(51) Int. Cl.
| | | |
|---|---|---|
| *B25J 17/00* | (2006.01) | |
| *F16C 7/02* | (2006.01) | |
| *F16H 21/44* | (2006.01) | |
| *F16C 3/02* | (2006.01) | |

(52) U.S. Cl.
CPC ............... *B25J 17/00* (2013.01); *F16C 7/02* (2013.01); *F16H 21/44* (2013.01); *F16C 3/02* (2013.01); *F16C 2322/59* (2013.01); *Y10S 901/23* (2013.01)

(58) Field of Classification Search
CPC .. B25J 17/00; F16H 21/44; F16C 7/02; F16C 3/02; F16C 2322/59; Y10S 901/23; F16K 1/52; F16K 1/32; F16K 1/224
See application file for complete search history.

(56) References Cited

U.S. PATENT DOCUMENTS

| | | | |
|---|---|---|---|
| 2007/0262743 A1* | 11/2007 | Kono ....................... | B25J 19/06 318/661 |
| 2011/0298343 A1* | 12/2011 | Kim ..................... | H05K 5/0008 312/223.6 |
| 2017/0274525 A1* | 9/2017 | Nagatsuka ............... | B25J 17/00 |
| 2017/0326736 A1* | 11/2017 | Nagatsuka ............... | B25J 17/00 |
| 2018/0170466 A1* | 6/2018 | Enoch .................. | B62D 57/032 |

* cited by examiner

*Primary Examiner* — Victor L MacArthur

(57) ABSTRACT

A servo transmission mechanism includes a servo main body, a first housing, a second housing, a connecting rod, and a linking member. The semi main body includes a first end having an output shaft and a second opposite end. The first housing is connected to the output shaft of the servo main body. The connecting rod has an upper end and a lower end that includes a connecting shaft, opposite ends of which are rotatably connected to the first housing and the second housing, respectively. The linking member rotatably connects the upper end of the connecting rod to the second end of the servo main body.

10 Claims, 1 Drawing Sheet

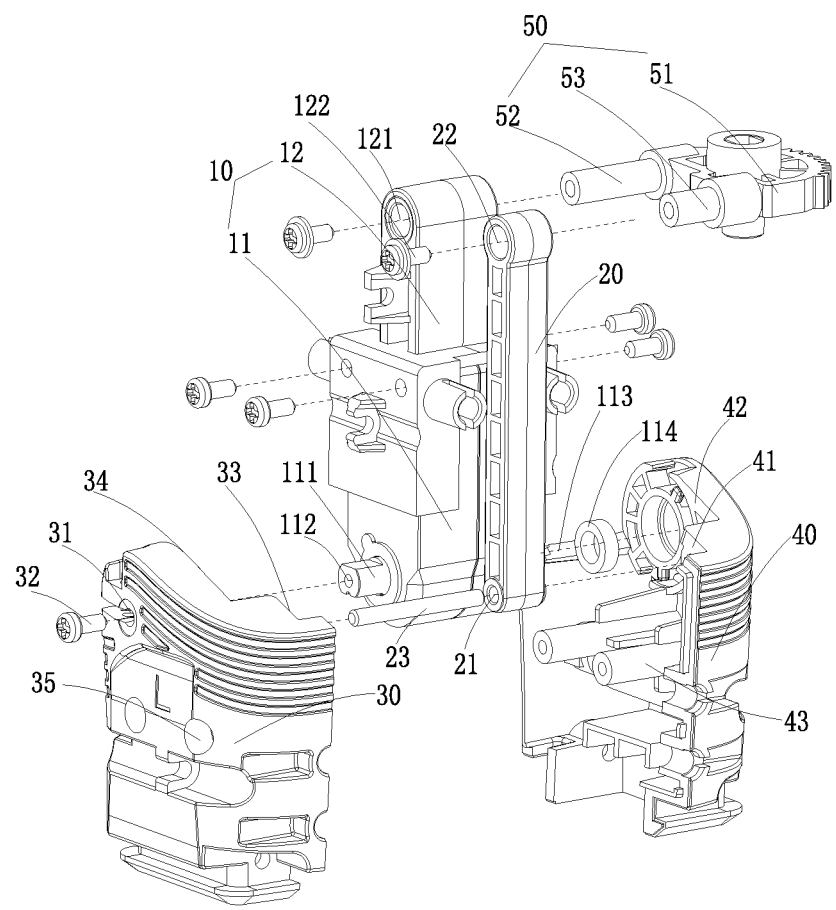

SERVO TRANSMISSION MECHANISM

CROSS REFERENCE TO RELATED APPLICATIONS

This application claims priority to Chinese Patent Application No. CN201711213160.4, filed Nov. 28, 2017, which is hereby incorporated by reference herein as if set forth in its entirety.

BACKGROUND

1. Technical Field

The resent disclosure generally relates to robots, and particularly to a servo transmission mechanism, a robot leg and a robot.

2. Description of Related Art

Some conventional robot legs include a servo and a transmission mechanism for transmitting rotation such that the legs can flex and move. However, the assembling process of the conventional transmission structures is complex and the high-precision parts are required, thereby resulting in high cost.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

The drawing is an isometric exploded view of a robot leg according to one embodiment.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

In the description, relative terms such as "upper," "lower," "up," "down," "top" and "bottom" as well as derivatives should be construed to refer to the orientation as then described or as shown in the drawing under discussion.

Referring to drawing, in one embodiment, a servo transmission mechanism includes a servo main body 10, a connecting rod 20, a first housing 30, a second housing 40 and a linking member 50. The servo main body includes a first, lower end having an output shaft 111 and a second, upper end. The connecting rod 20 is located at one side of the servo main body 10 and is parallel to the servo main body 10. The connecting rod 20 includes an upper end and a lower end having a connecting shaft 23. The first housing 30 is connected to the output shaft 111 of the servo main body 10 and rotatable with respect to the output shaft 111 when driven by the servo main body 10. The second housing 40 is connected to the servo main body 10 and opposite to the first housing 30. The second housing 40 is also connected to and rotatable together with the first housing 30. The connecting rod 20 includes an upper end and a lower end that includes a connecting shaft 23, opposite ends of which are rotatably connected to the first housing 30 and the second housing 40, respectively. The connecting rod 20 is thus rotatable together with the first housing 30. The linking member 50 is used to rotatable connect the upper end of the connecting rod 20 to the second end of the servo main body 10. The servo main body 10, the connecting rod 20, the first housing and the linking member 50 constitute a four-bar linkage mechanism. In the embodiment, they form a parallelogram linkage.

With such configuration as described in the above embodiment, when the servo main body 10 drives the first housing 30 to rotate, forward rotation and reverse rotation can be transmitted through the connecting rod 20, so as to reduce the complexity of the entire structure. The first housing 30 and the second housing 40 are both connected to the connecting rod 20 through the connecting shaft 23 so that the driving force on the first housing 30 or the second housing 40 can be transmitted to the connecting rod 20. Since the first housing 30 and the second housing 40 are connected to the connecting rod 20 via shaft-hole fit, the requirement for fit accuracy are relatively low. The requirement for the accuracy of parts is relative low and the manufacturing cost is thus reduced.

Specifically, as shown in the drawing, the first housing 30 and the second housing 40 are connected to a lower portion of the servo main body 10. The lower ends of the servo main body 10 and the connecting rod 20 are located between the first housing 30 and the second housing 40.

In the embodiment, the first housing 30 defines a number of positioning holes 35, and the second housing 40 includes a number of positioning posts 43 that protrude from an inner surface thereof and arranged and size according to the positioning holes 35. The positioning posts 43 are respectively received in the positioning holes 35. The first housing 30 is then properly positioned with respect to the second housing 30. A first cutout 33 is defined in a side surface of the first housing 30. A second cutout 41 is defined in a side surface of the second housing 40. The first cutout 33 and the second cutout 41 have the same configuration. When the first housing 30 and the second housing 40 are connected to each other, the first cutout 33 and the second cutout 41 corporately define an open-end space that allows the connecting rod 20 to perfectly fit therein. A third cutout 34 is defined in a side surface of the first housing 30, and a fourth cutout 42 is defined in a side surface of the second housing 40. When the first housing 30 and the second housing 40 are connected to each other, the third cutout 34 and the fourth cutout 42 corporately define an open-end space that allows the servo main body 10 to perfectly fit therein.

In the embodiment, the servo main body includes a supporting shaft 113 extending from one side thereof. A bearing 114 is arranged around the supporting shaft 113 and rotatably connects the second housing 40 to the supporting shaft 113.

In the embodiment, the output shalt 111 and the supporting shaft 113 are coaxial and located on opposite sides of the servo main both 10. The connecting shaft 23 of the connecting rod 20 is parallel to the output shaft 111, so that the stability of the parallelogram linkage can be ensured.

In the embodiment, the output shaft 111 defines a first threaded hole 112 at an end surface thereof. The first housing 30 defines a first through hole 31. The first housing 30 is connected to output shaft 111 via a first screw 32 passing through the first through hole 31 and screwed into the first threaded hole 112. The head of the first screw 32 abuts against the outer surface of the first housing 30, which ensures the stability of the connection between the output shaft 111 and the first housing 30.

In the embodiment, the linking member 50 includes a main body 51 and a first axle 52 and a second axle 53 that are connected to the lateral surface of the main body 51. The main body 51 includes a number a gear teeth on its lateral surface opposite to the first axle 52 and the second axle 53. The gear teeth mesh with a gear of the torso of the robot. The gear is driven by a motor and then rotates the main body 51, which drives the leg of the robot to spin around an axis that is substantially perpendicular to the first axle 52 and the second axle 53. This enables the leg of the robot to simulate the lateral axial rotation of a human leg. The leg of the robot will be described in detail in the following descriptions.

The first axle 52 is connected to the upper end of the servo main body 10, and the second axle 53 is connected to the upper end of the connecting rod 23. In the embodiment, the first axle 52 and the second axle 53 are held in position by screws. The servo main body 10 is rotatable with respect to the first axle 52, and the connecting rod 23 is rotatable with respect to the second axle 53.

In the embodiment, the lower end of the connecting rod 20 defines a second through hole 21 that allows the connecting shaft 23 to pass therethrough. The upper end of the connecting rod 23 defines a third through hole 22 that allows the second axle 53 to pass therethrough. The second end of the servo main body 10 define a fourth through hole 121 that allows the first axle 52 to pass therethrough.

In the embodiment, the servo main body 10 includes a servo 11 that the first housing 30 and the second housing 40 are connected to, and a support 12 that is connected to the servo 11. The fourth through hole 121 is defined in the support 12.

The present disclosure also provides a robot leg or more specifically thigh including the servo transmission mechanism of the above embodiments. With such configuration, the assembling process of the robot leg is simple, and the requirement for fit accuracy is low by using the connecting rod 20 to transmitting motion. The manufacturing cost can thus be reduced.

The present disclosure also provides a robot including the leg as described above.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A servo transmission mechanism comprising:
a servo main body comprising a first end having an output shaft and a second opposite end;
a first housing connected to the output shaft of the servo main body;
a second housing;
a connecting rod comprising an upper end and a lower end that comprises a connecting shaft, opposite ends of the connecting shaft are rotatably connected to the first housing and the second housing, respectively; and
a linking member configured to rotatably connect the upper end of the connecting rod to the second end of the servo main body.

2. The servo transmission mechanism according to claim 1, wherein the first housing and the second housing are connected to each other, and arranged at opposite sides of the servo main body.

3. The servo transmission mechanism according to claim 1, wherein the first housing is rotatable together with the output shaft, the servo main body comprises a supporting shaft extending from one side of the servo main body, a bearing is arranged around the supporting shaft and configured to rotatably connect the second housing to the supporting shaft.

4. The servo transmission mechanism according to claim 3, wherein the output shaft defines a first threaded hole at an end surface thereof, the first housing defines a first through hole, and the first housing is connected to output shaft via a screw passing through the first through hole and screwed into the first threaded hole.

5. The servo transmission mechanism according to claim 4, wherein the linking member comprises a main body, a first axle and a second axle that are connected to the main body, the second end of the servo main body is rotatably connected the first axle, and the upper end of the connecting rod is rotatably connected to the second axle.

6. The servo transmission mechanism according to claim 5, wherein the lower end of the connecting rod defines a second through hole that allows the connecting shaft to pass therethrough, the upper end of the connecting rod defines a third through hole that allows the second axle to pass therethrough, and the second end of the servo main body define a fourth through hole that allows the first axle to pass therethrough.

7. The servo transmission mechanism according to claim 6, wherein the servo main body comprises a servo that the first housing and the second housing are connected to, and a support that is connected to the servo, and the fourth through hole is defined in the support.

8. The servo transmission mechanism according to claim 3, wherein the supporting shaft and the output shaft are coaxial, and parallel to the connecting shaft.

9. A leg for robot, the leg comprising a servo transmission mechanism, the servo transmission mechanism comprising:
a servo main both comprising a first end having an output shaft and a second opposite end;
a first housing connected to the output shaft of the servo main body;
a second housing;
a connecting rod comprising an upper end and a lower end that comprises a connecting shaft, opposite ends of the connecting shaft are rotatably connected to the first housing and the second housing, respectively; and
a linking member configured to rotatably connect the upper end of the connecting rod to the second end of the servo main body.

10. A robot comprising a leg, the leg comprising a servo transmission mechanism, the servo transmission mechanism comprising:
a servo main body comprising a first end having an output shaft and a second opposite end;
a first housing connected to the output shaft of the servo main body;
a second housing;
a connecting rod comprising an upper end and a lower end that comprises a connecting shaft, opposite ends of the connecting shaft are rotatably connected to the first housing and the second housing, respectively; and a linking member configured to rotatably connect the upper end of the connecting rod to the second end of the servo main body.

\* \* \* \* \*